United States Patent [19]

Drum

[11] Patent Number: 4,608,295

[45] Date of Patent: Aug. 26, 1986

[54] PAPER SUPPORT

[75] Inventor: Henner Drum, Rhodt, Fed. Rep. of Germany

[73] Assignee: Hoechst Aktiengesellschaft, Frankfurt am Main, Fed. Rep. of Germany

[21] Appl. No.: 659,965

[22] Filed: Oct. 11, 1984

[30] Foreign Application Priority Data

Oct. 12, 1983 [DE] Fed. Rep. of Germany ....... 3337023

[51] Int. Cl.[4] .......................... B32B 7/06; B32B 27/10

[52] U.S. Cl. .................................... 428/202; 428/211; 428/342; 428/421; 428/422

[58] Field of Search ............... 428/211, 201, 202, 422, 428/421, 342; 156/234

[56] References Cited

U.S. PATENT DOCUMENTS

| | | | |
|---|---|---|---|
| 4,049,860 | 9/1977 | Armbrust et al. | 428/201 |
| 4,399,177 | 8/1983 | Ozasa | 428/211 X |
| 4,529,654 | 7/1985 | Drum | 428/211 X |

*Primary Examiner*—Thomas J. Herbert
*Attorney, Agent, or Firm*—Schwartz, Jeffery, Schwaab, Mack, Blumenthal & Evans

[57] ABSTRACT

Disclosed is a paper support which is suitable for use as a base for printed layers and/or varnish layers which are applied to one side of the support, in particular for slide-off decals. The support comprises a paper which is free from aluminum ions, particularly free from aluminum sulfate, and has a covering coating comprising fluoroalkylphosphate or perfluoroalkylphosphate and, optionally, a thickening agent, applied to its reverse side. Any aluminum ions which may possibly be present are rendered non-reactive by complexing.

14 Claims, 1 Drawing Figure

FIG.
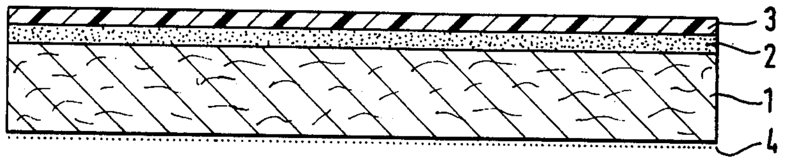

PAPER SUPPORT

BACKGROUND OF THE INVENTION

The present invention is directed to a paper support which is suitable for use as a base for printed layers and/or varnish layers which are applied to one side of the support. The paper support is especially suitable for use as a base for slide-off decals.

Slide-off decals which are used for decorating articles made of ceramics, porcelain, glass, enamel or plastic, essentially comprise a support of water-permeable paper provided with a barrier layer and a release layer, to which a detachable, cohesive varnish masking film containing the decorative image has been applied. For film-forming, resins comprising acrylate and/or methacrylate polymers are generally employed. The varnish mask also serves to stiffen the more or less thick colorant coatings of the decorative image, which can thus readily be transferred to the article to be decorated. Varnishes comprising acrylate and/or methacrylate polymers are preferably used in those cases in which the slide-off decal, which has been transferred to the article, is later burnt-in, since acrylate and methacrylate polymers are quickly decomposed by baking and do not pass through a liquid stage. As a result, any change or disintegration of the decorative image is prevented.

It has been found that a varnish mask, which comprises the above-described resins and is present on a paper support, tends to develop undesired sticking, for example, under compressive stress, in particular, when it covers a relatively thick, relief-type colorant coating. This area-wide adhesion, which can also be an almost punctiform adhesion in the case of only a few points of contact, of the varnish mask to the reverse side of the sheet which lies on top of the varnish mask in a stack of sheets, is caused both by the weight of the superposed sheets and by solvent residues or plasticizer additions which are retained in the varnish due to temperature and atmospheric humidity.

To prevent the printed and/or varnished sheets from sticking together, it has already been proposed to interpose waxed tissue paper between the individual sheets. Attempts have also been made to prevent the unfavorable adhesion of adjacent sheets by covering the printed layer and/or varnish layer with wax-type products. However, this procedure has the disadvantage that each individual sheet must be coated in an additional process step. Moreover, the problem of mutual adhesion of the sheets cannot be completely overcome by this process. Also, the method of interposing sheets of tissue paper, which results in useful pictures even after prolonged storage, is very expensive and requires several additional process steps, for example, exact interposing and removing of the tissue paper which cannot be used again after removal. In addition, the sheets must be cut up in accordance with the decorative images before use and any superfluous decals remaining on the supports are stored again in a stack, without intermediate tissue-paper sheets. When these decals are to be employed at a later time, they usually stick together and are thus rendered useless.

German Offenlegungsschrift No. 2,551,860 (corresponding to U.S. Pat. No. 4,049,860) discloses a paper support for decals in which the reverse side of the support, i.e. the side of the support which does not have the printed and/or varnish layers, is provided with a water-permeable covering layer containing a polysiloxane and a polyalkylene glycol wax. However, a disadvantage of this support is that the penetration speed of water is slowed by the covering layer so that it takes a longer time for the decorative image to be released by the dissolving release layer. This is particularly unfavorable in an automatic image transfer process, in which the contact time of the slide-off decals with water and the dwell time before image transfer must proceed according to a predetermined cycle. Moreover, the covering layer may increase the blocking resistance of the reverse side of the paper to such an extent that transport problems can arise, in particular, in screen printing machines, where the sheets, which have left the printing station, lie unfixed on conveyor belts and are transported to the dryer at a rising angle. Due to the reduced adhesion, the sheets can then slip on the belts in an uncontrolled manner, thus causing troublesome machine stoppages.

SUMMARY OF THE INVENTION

It is therefore an object of the present invention to provide a paper support which is suitable for use as a base for printed layers and/or varnish layers applied to one side of the support, which has a reverse side having a satisfactory oleophobic character with respect to the printed layers and/or varnish layers, which are present on an adjacent sheet in a stack of sheets, and thus prevents blocking.

Another object of the present invention is to provide a paper support in which the reverse side exhibits good adhesion to the supports used in processing.

Yet another object of the present invention is to provide a paper support having the above-noted properties and in which the water absorbency of the paper is unaffected to the greatest extent possible.

Therefore, in accordance with the present invention, there has been provided a paper support which is suitable for use as a base for printed layers and/or varnish layers applied to one side of the support, in particular for slide-off decals, comprising an aluminum ion-free paper, a barrier layer applied to one surface of the paper, a release layer applied to the barrier layer, and a covering coating comprising a fluoroalkylphosphate applied to the other surface, i.e., the reverse side, of the paper.

In a preferred embodiment, the paper support is free from aluminum sulfate and is provided with a covering coating of perfluoroalkylphosphate having from 1 to 4 carbon atoms in the alkyl group. In another preferred embodiment, the covering coating includes a thickening agent.

As a result, the paper support has been treated on its reverse side in such a way that it exhibits a penetration speed for water, which nearly corresponds to that of untreated paper but, nevertheless, also exhibits an improved oleophobic character, due to the covering coating of the present invention, which prevents blocking of the slide-off decals printed on the paper support when stored in a stack. On the whole, good storability of the decals is thus achieved, and operating with automatic machines is rendered possible.

Further objects, features and advantages of the present invention will become apparent from the detailed description of preferred embodiments which follows, when considered together with the attached figure of drawing.

BRIEF DESCRIPTION OF THE DRAWING

The FIGURE provides a cross-sectional illustration of the paper support according to the present invention.

DETAILED DESCRIPTION OF PREFERRED EMBODIMENTS

The accompanying drawing shows the paper support of the present invention in a diagrammatic representation. In the drawing, reference numeral 1 denotes the paper support which is provided with a barrier layer 2 and a release layer 3. The printed layers and/or varnish layers forming the varnish mask containing the decorative image, not shown in the drawing, are applied to the release layer. Reference numeral 4 refers to the covering coating of the present invention, which is applied to the reverse side of the support.

According to the present invention, the paper support 1 is free from aluminum ions. For this purpose, a paper is preferred in which aluminum ions, which result from the use of alum, are not present. In case the paper support should still contain aluminum ions, care must be taken to bind the aluminum ions by complexing, for example, by chelating, in such a way that the aluminum ions cannot enter into reaction when the paper support is soaked in water.

It has been found that alum quantities of as little as about 0.1%, relative to absolutely dry fibers, considerably influence the absorbency of the paper, without producing a more strongly pronounced oleophobic character of the paper. According to the present invention, alum should also be prevented from penetrating into the paper in small amounts by way of industrial water having a residual alum content or from alum-containing waste paper used in proportionate quantities in the papermaking process.

Commercially available products such as SCOTCHBAN, manufactured by 3M Company, or ZONYL, manufactured by DuPont, can be used as the fluoroalkylphosphates for the covering coating. These products represent fluorinated alkyl esters or orthophosphoric acid or of alkali metal phosphates, the alkyl groups of which have from 1 to 4 carbon atoms. Perfluoroalkylphosphate esters, for example, perfluorinated monoalkylphosphate esters or dialkylphosphate esters having 2 carbon atoms in the alkyl group, are preferably used.

The covering coating is applied to the reverse side of the paper support in the form of an aqueous solution. Depending on the travelling speed of the paper web, solutions of the fluoroalkylphosphate having concentrations of less than about 2% by weight, preferably from about 0.3 to 1% by weight, are suitable for this purpose. In the dry state, the covering coating has a weight of about 0.05 to about 0.5 $g/m^2$. The solvents used comprise mixtures of water and alcohol, particularly isopropanol, in ratios between about 1:9 and 9:1. The preferred mixtures contain up to about 25% by weight of isopropanol.

It has been found that the application of the aqueous solution is improved when the solution is slightly thickened to reduce penetration of the fluoroalkylphosphates into the absorbent paper support. Suitable thickening agents include alginates, polyvinyl alcohol, carboxymethyl cellulose, gums or other high-molecular weight substances which have a strong thickening effect. The preferred thickening agents are carboxyvinyl polymers, for example, polyacrylates. As a result, the concentration of the fluoroalkylphosphate according to the present invention, can be reduced to less than about 0.5% by weight, preferably to about 0.3% by weight, without thereby detracting from the intended effect. The thickening agent is used in concentrations ranging from about 0.05 to 0.2% by weight, preferably from about 0.08 to 0.1% by weight.

The paper support of the present invention is produced in a conventional manner, for example, on a sheet former to give a basic weight of about 100 to 200 $g/m^2$. The pulp used is free from aluminum sulfate and may contain a suitable starch and additionally kaolin, as fillers. After drying, the upper side of the paper support is provided with a barrier layer 2 which prevents the water-soluble release layer 3 applied on top of the barrier layer 2 from penetrating into the paper support. Surface sizing or application of a cohesive coating of starch, casein, size, alkali metal silicate, water glass, etc., optionally containing a clay filler, serves to form the barrier layer 2 which renders the surface of the paper support 1 less porous. The material used to produce the release layer 3 is selected from water-soluble mono, oligo or polysaccharides. Usually, dextrin is employed for this purpose. It is, however, also possible to form the release layer from polymers, such as polyglycols or polyvinyl alcohols, used either alone or in admixture.

After the layers 2 and 3 have, in each case, been applied and dried, the reverse side of the paper support is coated with the solution of fluoroalkylphosphate, optionally combined with a thickening agent and thereafter dried. The fluoroalkylphosphate solution is, for example, applied by means of a coating knife, a wire-wound doctor or an engraved roll. Drying can be effected in the range between about room temperature and about 150° C., for example, automatically in a hot-air drying channel. In the paper supports of the present invention, drying conditions do not result in a different effect of the covering coating applied to the reverse side of the support.

The printing layers and/or varnish layers can thereafter be applied to the release layer 3 in the usual manner.

The invention is explained in further detail by the examples which follow.

EXAMPLES (A) Paper sheets which had a basic weight of 150 $g/m^2$ were formed on a sheet former. Using tap water, the following percentages of alum, based on the weight of air-dry fibers, were added.

TABLE 1

| Sample | Alum Content (%) | Diameter of Drop of $H_2O$ (mm) |
|---|---|---|
| 1 | 0 | 10 |
| 2 | 0 | 8 |
| 3 | 0.1 | 3 |
| 4 | 0.2 | 3 |
| 5 | 0.5 | 3 |
| 6 | 0 | 5 |
| 7 | 0 | 8 |

Sample 1 did not possess a covering coating according to the present invention. Sample 6 corresponded to a paper support as described in U.S. Pat. No. 4,049,860 having a covering coating comprising a polysiloxane and a polyalkylene glycol wax.

Samples 2 to 5 were manually coated with a 2% strength solution of perfluoroethylphosphate in water mixed with 10% of isopropanol. For coating, a wire-wound doctor having a wire thickness of 0.2 mm was used. The samples were dried for 1 minute in a drying cabinet at 100° C.

A perfluoroethylphosphate solution having only a 0.3% strength, which had been thickened with 0.1% of polyacrylic acid was applied to Sample 7. In this case, an engraved roll provided with a screen of 40 lines per centimeter was used for coating. Although a lower concentration of the solution and a reduced application of wet material resulted in a considerably reduced amount of active substance applied, the test results do not differ from those obtained for Sample 2. Accordingly, the thickening agent produces an improvement in the retention of perfluoroethylphosphate, due to its rheological behavior (high thixotropy to prevent penetration). This is of particular importance in the highly absorbent paper support.

A drop of water was thereafter placed onto the dried covering coating and allowed to act for one minute, after which the remainder of the drop was removed from the coating by dabbing same with a cotton cloth. The spread of the drop was measured in each case and entered as the drop diameter in Table 1.

Sample 1 represents the normal absorbing behavior of an aluminum-ion free paper. Samples 2 and 7 show the results obtained with the covering coating of the present invention, while Samples 3 to 5 indicate the effect of aluminum ions on the absorbing behavior. The drop diameter of 3 mm given in Table 1 for Samples 3 to 5, virtually corresponds to the size of the applied drop, i.e., the samples are water-repellent and hardly absorptive. In the sheet of Sample 6, in which the reverse side has a covering layer of polysiloxane/polyalkylene glycol, a drop diameter of 5 mm is obtained, which indicates improved absorbency, as compared with Samples 3 to 5.

(B) The paper support of the present invention is tested for its behavior toward oil constituents, according to the following procedure.

Paper sheets corresponding to Samples 1 (I), 6 (II), 2 (III) and 7 (IV) of Example A were coated with a clear varnish and dried. The varnish used is conventionally employed in printed and/or varnish layers for the production of decals and comprises a copolymer of acrylates and methacrylates. In the test, bleed-through of the varnish into the paper support was determined.

The test conditions used were considerably restrictive, as compared to practical requirements. In practice, the sheets are stacked, with the varnish layer and the covering layer on the reverse side of the support contacting each other only in sections or at individual points and being present in the form of separate layers. In contrast, in this test, the layers are applied one on top of the other. The test results are compiled in Table 2 which follows:

TABLE 2

| Sample | Bleed-through |
|---|---|
| I | severe |
| II | slight |
| III | nonexistent |
| IV | nonexistent |

The test results show the excellent barrier effect (oleophobic character) of the covering coating of the present invention, which is applied to the reverse side of the paper support (Samples III and IV).

(C) Another means of controlling the oleophobic character of the covering coating according to the present invention can be carried out in such a way that paper sheets, according to Example B, are treated with organic solutions having defined, varying surface tensions and the penetration of the varnish constituents into the reverse side of the paper support which is either untreated or has been prepared according to the present invention, is then determined (Kit-Test, TAPPI Useful Method 557). For testing, solutions of castor oil in different toluene/heptane mixtures are used, which are divided into grades from 1 to 12, corresponding to surface tensions from 34.5 mN/m to 22.0 mN/m.

TABLE 3

| Sample | Value (determined by Kit-Test) | mN/m |
|---|---|---|
| I | 1 | 34.5 |
| II | 2 | 32.7 |
| III | 5-6 | 25-24 |
| IV | 5-6 | 25-24 |

As can be seen from Table 3, Samples III and IV, which have the covering coating of the present invention, exhibit, by far, the best penetration resistance toward oil constituents. In Sample II, the behavior is only slightly improved over that of untreated paper.

In a practical test, sheets which had been imaged in a screen-printing process and provided with a superposed varnish mask were stored in a stack for one week.

The stacks of sheets were additionally loaded with a weight of 225 p/cm$^2$.

Sheets III and IV according to Table 3, which had been treated in accordance with the present invention, did not stick together, whereas the untreated sheets had become blocked to such an extent that the paper support split when separation of the sheets was attempted.

What is claimed is:

1. A paper support which is suitable for use as a base for printed layers and/or varnish layers which are applied to one side of the support, in particular for slide-off decals, comprising:

a layer of an essentially aluminum ion-free paper;

a barrier layer applied to the obverse surface of said paper;

a release layer applied to said barrier layer; and a covering coating comprising a fluoroalkylphosphate applied to the reverse surface of said paper.

2. A slide-off decal, comprising a varnish masking film containing an image applied to a paper support, wherein said support comprises a paper support as defined in claim 1.

3. A paper support as claimed in claim 1, wherein said fluoroalkylphosphate is selected from fluorinated alkyl esters of orthophosphoric acid and alkali metal phosphates, having from 1 to 4 carbon atoms in the alkyl group.

4. A paper support as claimed in claim 1, wherein said covering coating comprises a perfluoroalkylphosphate ester, having from 1 to 4 carbon atoms in the alkyl group.

5. A paper support as claimed in claim 1, wherein said paper comprises an essentially aluminum sulfate-free paper and said covering coating comprises a perfluoroethylphosphate ester.

6. A paper support as claimed in claim 1, wherein said paper comprises a complexing-promoted, essentially aluminum ion-free paper.

7. A paper support as claimed in claim 1, wherein said covering coating is present in an amount from about 0.05 to 0.5 g/m$^2$.

8. A paper support as claimed in claim 1, wherein said covering coating is produced from a solution comprising less than about 2% by weight of said fluoroalkylphosphate.

9. A paper support as claimed in claim 8, wherein said solution comprises from about 0.3 to 1% by weight of said fluoroalkylphosphate.

10. A paper support as claimed in claim 1, wherein said covering coating further comprises a thickening agent.

11. A paper support as claimed in claim 10, wherein said thickening agent comprises a carboxyvinyl polymer.

12. A paper support as claimed in claim 10, wherein said thickening agent comprises a polyacrylate.

13. A paper support as claimed in claim 10, wherein said thickening agent comprises from about 0.05–0.2% by weight of said covering coating.

14. A paper support as claimed in claim 13, wherein said thickening agent comprises from about 0.08–0.1% by weight of said covering coating.

* * * * *